US008460042B2

(12) United States Patent
Conner, Jr.

(10) Patent No.: US 8,460,042 B2
(45) Date of Patent: *Jun. 11, 2013

(54) SURFBOARD HAVING A HONEYCOMB CORE

(75) Inventor: Edison S. Conner, Jr., Manhattan Beach, CA (US)

(73) Assignee: Varial Surfing Technologies, LLC, Manhattan Beach, CA (US)

(*) Notice: Subject to any disclaimer, the term of this patent is extended or adjusted under 35 U.S.C. 154(b) by 75 days.

This patent is subject to a terminal disclaimer.

(21) Appl. No.: 12/916,328

(22) Filed: Oct. 29, 2010

(65) Prior Publication Data

US 2011/0045720 A1 Feb. 24, 2011

Related U.S. Application Data

(63) Continuation of application No. 11/447,479, filed on Jun. 5, 2006, now Pat. No. 7,845,999.

(60) Provisional application No. 60/687,200, filed on Jun. 4, 2005, provisional application No. 60/764,287, filed on Jan. 31, 2006.

(51) Int. Cl.
*A63C 5/03* (2006.01)

(52) U.S. Cl.
USPC .............................. 441/74; 114/357

(58) Field of Classification Search
USPC ...................... 441/65, 74; 114/357
See application file for complete search history.

(56) References Cited

U.S. PATENT DOCUMENTS

| 3,514,798 A | 6/1970 | Ellis |
| 3,543,315 A | 12/1970 | Hoffman |
| 4,042,238 A | 8/1977 | Theriault |
| 4,731,038 A | 3/1988 | Hancock et al. |
| 5,119,535 A | 6/1992 | Gnagy et al. |
| 5,183,618 A | 2/1993 | Pascal et al. |
| 5,486,096 A | 1/1996 | Hertel et al. |
| 5,489,228 A | 2/1996 | Richardson et al. |
| 5,514,017 A | 5/1996 | Chimiak |

(Continued)

FOREIGN PATENT DOCUMENTS

WO WO 01/51350 C2 7/2001

OTHER PUBLICATIONS

Flexural and Impact Properties of Sandwich Panels Used in Surfboard Construction, J.A. Manning, A.G. Crosky, and S. Bandyopadhyay, Advanced Composites '93, International Conference on Advanced Composite Materials, The Minerals, Metals & Materials Society, 1993, pp. 123-126.

(Continued)

*Primary Examiner* — Edwin Swinehart
(74) *Attorney, Agent, or Firm* — Klein, O'Neill & Singh, LLP

(57) ABSTRACT

An aquatic gliding board such as a surfboard is constructed using a honeycomb material for the core. The composite outer skin of the surfboard is constructed of materials having similar flexibility properties as found in a traditional foam/fiberglass surfboard. In a particularly preferred embodiment an aluminum honeycomb core is employed along with a fiberglass skin in order to achieve a surfboard with decreased weight and increased strength to resist failure in bending relative to a traditional foam/fiberglass surfboard, but having similar flexibility characteristics to such a traditional surfboard, or having increased flexibility relative to such a traditional surfboard.

20 Claims, 11 Drawing Sheets

U.S. PATENT DOCUMENTS

| | | | | |
|---|---|---|---|---|
| 5,816,876 | A | * | 10/1998 | Hamilton ........................ 441/74 |
| 6,109,991 | A | | 8/2000 | McClaskey |
| 6,429,157 | B1 | | 8/2002 | Kishi et al. |
| 6,692,321 | B2 | | 2/2004 | Metrot |
| 6,736,689 | B2 | | 5/2004 | Renard et al. |
| 6,790,402 | B2 | | 9/2004 | Greven |
| 6,827,617 | B2 | | 12/2004 | Metrot |
| 6,878,025 | B2 | | 4/2005 | Mead |
| 7,845,999 | B2 | * | 12/2010 | Conner, Jr. ...................... 441/74 |
| 2003/0121596 | A1 | | 7/2003 | Greven |
| 2004/0005825 | A1 | | 1/2004 | Hasted |
| 2004/0053055 | A1 | | 3/2004 | Robinson |
| 2004/0251577 | A1 | | 12/2004 | Greven |

OTHER PUBLICATIONS

HexWeb Honeycomb Attributes and Properties, A comprehensive guide to standard Hexcel honeycomb materials, configurations, and mechanical properties, Hexcel Composites, 1999.

An analysis of the future of the surfboard industry, by: Gordon Clark, Oct. 1, 2004.

* cited by examiner

SURFBOARD HAVING A HONEYCOMB CORE

CROSS-REFERENCE TO RELATED APPLICATIONS

This application is a continuation of U.S. application Ser. No. 11/447,479, which was filed on Jun. 5, 2006, and which was based on and claims benefit of U.S. Provisional Application Ser. No. 60/687,200, which was filed on Jun. 4, 2005, and also claims the benefit of U.S. Provisional Application Ser. No. 60/764,287, which was filed on Jan. 31, 2006. The entirety of each of these priority applications is hereby incorporated by reference.

BACKGROUND

1. Field of the Invention

The present invention is in the field of aquatic gliding boards, and more particularly to surfboards having a honeycomb core material.

2. Description of the Related Art

Aquatic gliding boards, such as surfboards and windsurfing boards, are traditionally made through a standard production technique in which polyurethane foam is cut to a desired shape and then encased in a fiber-reinforced plastic skin, such as fiberglass. The low-density polyurethane foam core material is used in an effort to minimize weight. However, such a core, though light, provides minimal strength to resist breakage, and traditional polyurethane foam/fiberglass surfboards are known to break easily, especially in large surf.

Further, high performance surfboard riders desire extremely lightweight surfboards. The traditional foam/fiberglass surfboard construction is at or approaching its limits with regard to reducing weight. For example, to decrease the weight of a traditional foam/fiberglass surfboard, designers typically thin the foam core or decrease the amount of fiber reinforcement used. However, these actions tend to result in a surfboard that is weak and brittle, and also decrease the surfboard's buoyancy. Eventually, the surfboard becomes fragile so as to be unreliable for high performance use. Also, if the board does not have sufficient buoyancy, it may become inappropriate for use. Thus, there are limits to weight reduction for a surfboard constructed using the traditional foam/fiberglass approach. Further, as designers approach the lower weight limits by producing thin foam boards with minimal fiberglass reinforcement, such fragile boards tend to crack and absorb water in the course of normal use. Thus, those who surf regularly often must replace multiple boards every year.

There have been several attempts to produce a durable, lightweight board, all of which have realized only limited success. For example, boards sold under the trade name, "Tuflite" incorporate a layer of high density foam under the surface of the exterior fiberglass skin to improve resistance to breaking and cracking. However, this construction method tends to produce boards that are very stiff. Many advanced surfers consider Tuflite boards to have poor performance characteristics.

U.S. Pat. No. 3,514,798 discloses surfboards made by adhering sheets of honeycomb material onto inner surfaces of top and bottom skin portions, which are connected to form a surfboard. The board has a hollow interior, as the honeycomb sheets do not extend through the full thickness of board. This approach has not been successful, as the weight savings of such construction has not been shown to be significant, and board performance has not been shown to be superior to traditional boards.

U.S. Pat. No. 5,514,017 teaches a surfboard having a honeycomb core made of Nomex®. This patent expressly teaches against using an aluminum honeycomb core, because the '017 inventor's surfboard designs would be heavier if using an aluminum honeycomb core than a foam core, and performance would thus be likely hindered. There is no discussion of shaping the honeycomb in the '017 patent, and the drawings illustrate a honeycomb that has a generally rectangular cross-section. Additionally, nowhere in the patent is it anticipated that the cross-sectional thickness along the length of the honeycomb will be varied.

To Applicant's knowledge, no honeycomb core surfboard has ever been commercially successful, as such surfboards have not been able to simultaneously increase strength, maintain or enhance performance characteristics relative to a traditional surfboard, or save weight sufficiently to justify the cost of the honeycomb construction.

SUMMARY OF THE INVENTION

Applicant has determined that a superior surfboard would be one that is stronger and lighter than a traditional foam/fiberglass surfboard, while maintaining flexibility characteristics very similar to a traditional foam surfboard. Applicant has determined that a honeycomb core having certain characteristics in combination with a specially-designed composite skin can achieve these goals.

In accordance with one embodiment, the present invention provides a high performance surfboard configured to be flexible in longitudinal bending while resisting breakage. The surfboard comprises a lightweight core and a skin enclosing the core. The core comprises an aluminum honeycomb having a cell size of about $3/8$ inch or less and a foil thickness of about 0.003 inch or less. The skin encloses the lightweight core between a deck portion of the skin and a bottom portion of the skin. The skin further comprises fibers suspended in a cured adhesive matrix. An outer surface of the skin has a curving shape adapted so that a thickness of the surfboard varies along a longitudinal length and a transverse width of the surfboard. The aluminum honeycomb core extends substantially the full varying thickness of the surfboard between the deck and bottom portions of the skin, and a longitudinal center line of at least one cell of the honeycomb core is directed generally perpendicular to the deck portion of the skin.

In another embodiment, the fibers are encased in a cured resin having a resin content of less than about 75% by volume. In still another embodiment, fibers are encased in a cured resin having a resin content of less than about 65% by volume.

In still another embodiment, the compressive strength of the surfboard in a direction generally perpendicular to the deck portion of the skin is at least about 240 pounds per square inch. In yet another embodiment, the honeycomb cell size is about $3/16$ inch or less and the foil thickness is about 0.0015 inch or less. In another embodiment, the honeycomb cell size is about $1/4$ inch or less and the foil thickness is about 0.002 inch or less. In still another embodiment, the honeycomb cell size is about $3/16$ inch or less and the foil thickness is about 0.001 inch or less. In yet another embodiment, the honeycomb cell size is about $5/32$ inch or less and the foil thickness is about 0.001 inch or less. In yet further embodiments, a thickness of at least part of the deck portion of the skin is less than about 0.03 inches.

In another embodiment, a portion of the deck portion of the skin overlaps a portion of the bottom portion of the skin along a curving rail of the surfboard. In yet another embodiment, an expanded foam is disposed between the skin along the rail and a side portion of the aluminum honeycomb core. In a still further embodiment, the deck portion and bottom portion are separately formed. In yet another embodiment, the resin comprises rubber toughened epoxy.

In accordance with yet another embodiment, a method of making an aquatic gliding board is provided. The method comprises providing a first skin portion extending longitudinally from a tip to a tail and having a generally upturned curving rail formed along an edge of the first skin portion, the first skin portion comprising fibers encased in a cured adhesive matrix, providing an aluminum honeycomb core generally shaped to complement the first skin so that a space is disposed between an edge of the core and the curving rail, the aluminum honeycomb core varying in thickness between a tip and tail and between opposing edges of the core, the core comprising generally hollow cells arranged so that a longitudinal center line of at least one of the cells is generally perpendicular to the first skin portion, adhering the core to the first skin portion, delivering a foam into the space between the edge of the core and the rail, allowing the foam to expand to fill the space, providing a second skin portion configured to generally complement the first skin portion and the honeycomb core, and adhering the second skin portion to the core, foam and first skin so that a rail portion of the second skin at least partially overlaps the rail of the first skin portion. The aluminum honeycomb core substantially fills the entire thickness of the board between the first and second skins.

In a further embodiment, the first skin portion comprises at least two layers of substantially unidirectional plies of fibers oriented within about 5° of a longitudinal axis of the board. In yet a further embodiment, the first skin portion additionally comprises at least one layer of substantially unidirectional fibers oriented about 90° relative to the longitudinal axis of the board.

In yet another embodiment, at least one of the first and second skin portions comprises a viscoelastic damping layer arranged to engage the aluminum honeycomb core when the board is assembled.

In accordance with yet another embodiment, the present invention provides an aquatic gliding board comprising an aluminum honeycomb core, a skin enclosing the core, and a layer of viscoelastic material disposed on an inner surface of the skin. The core has a tip, a tail, and opposing edges between the tip and tail. A thickness of the core varies along a length of the board between the tip and tail and along a width of the board between the opposing edges. The skin comprises a deck portion and a bottom portion that are formed separately from one another. The deck and bottom portions of the skin each have a composite comprising fibers encased in a cured resin. The viscoelastic material is dispose on at least one of the deck and bottom portions of the skin. The skin engages the core so that cells of the honeycomb core extend substantially the full thickness between the deck and bottom portions of the skin, and the viscoelastic material engages the honeycomb core.

In another embodiment, the fibers comprise glass fibers, and the resin comprises a rubber-toughened epoxy. In still another embodiment, the honeycomb core has a hexagonal cell size of about 3/16 inch or less and a foil thickness of about 0.001 inch or less. In another embodiment, the deck and bottom portions of the skin each have resin content of less than about 75% by volume.

In accordance with a still further embodiment, a high performance surfboard configured to be flexible in longitudinal bending while resisting breakage is provided. The surfboard comprises a lightweight core comprising a honeycomb material, and a skin enclosing the lightweight core between a deck portion of the skin and a bottom portion of the skin. The skin comprises fibers suspended in a cured matrix. An outer surface of the skin has a curving shape adapted so that a thickness of the surfboard varies along a longitudinal length and a transverse width of the surfboard. The honeycomb core extends substantially the full varying thickness of the surfboard between the deck and bottom portions of the skin, and a longitudinal center line of at least one cell of the honeycomb core is directed generally perpendicular to the deck portion of the skin. A ratio of the Young's modulus of the skin to the compressive modulus of the core is about 100 or less, and the core has a density of about 4.5 lb./ft^3 or less.

In another embodiment, the core has a density of about 3.5 lb./ft^3 or less. In a further embodiment, the ratio of the Young's modulus of the skin to the compressive modulus of the core is about 60 or less.

DETAILED DESCRIPTION OF PREFERRED EMBODIMENTS

Figure 1:
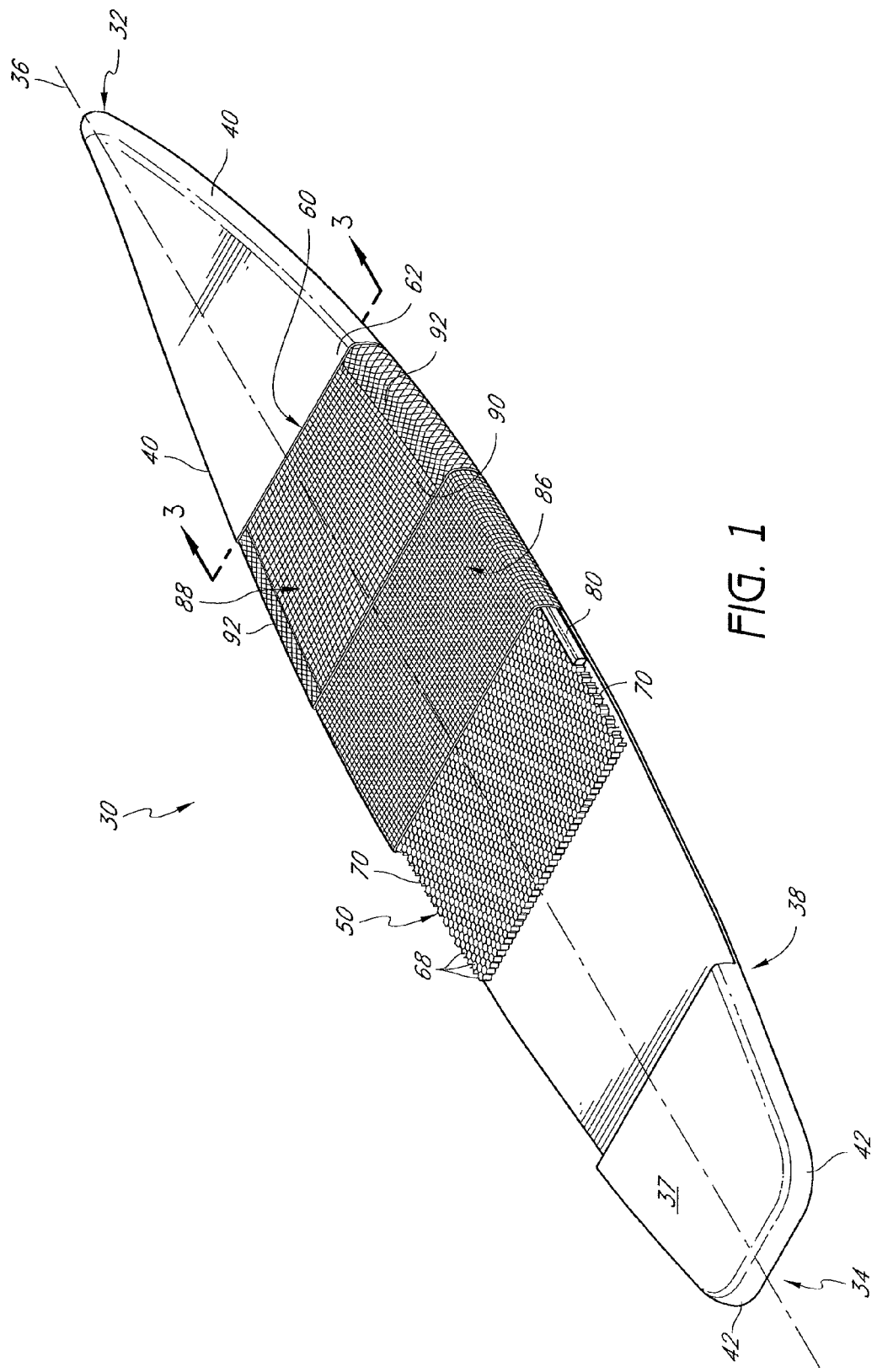
FIG. 1 is a perspective partial cut-away view of one embodiment of a surfboard having features in accordance with the present invention.
Figure 2:
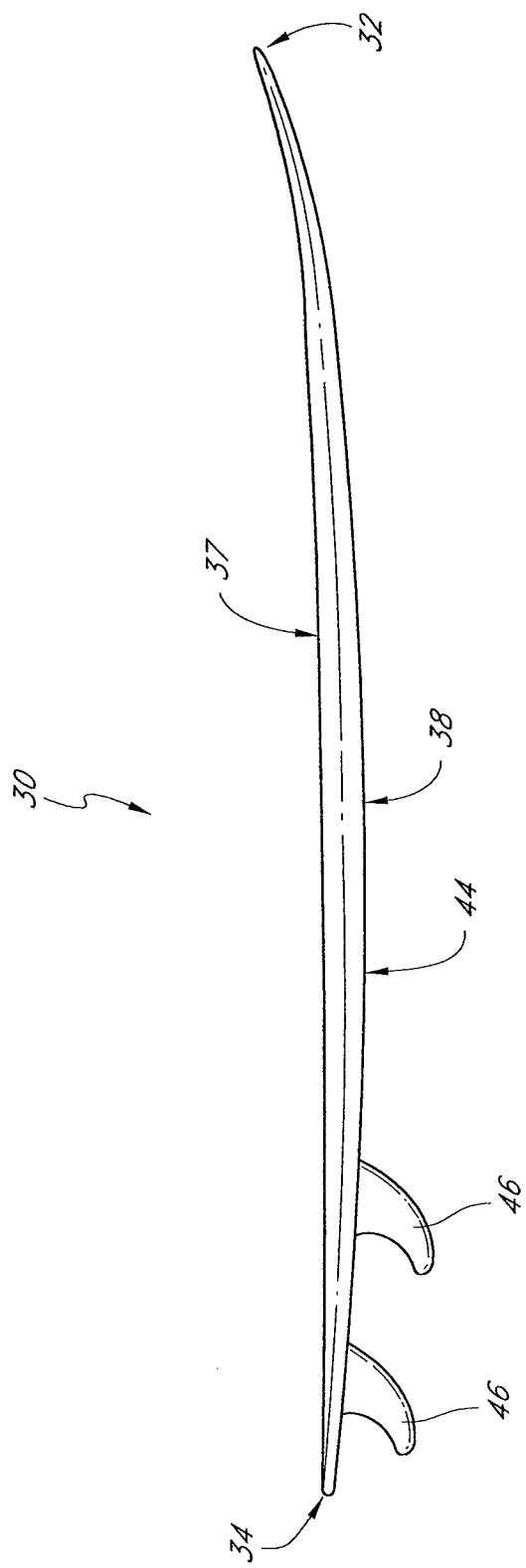
FIG. 2 is a side elevational view of the surfboard of FIG. 1.
Figure 3:
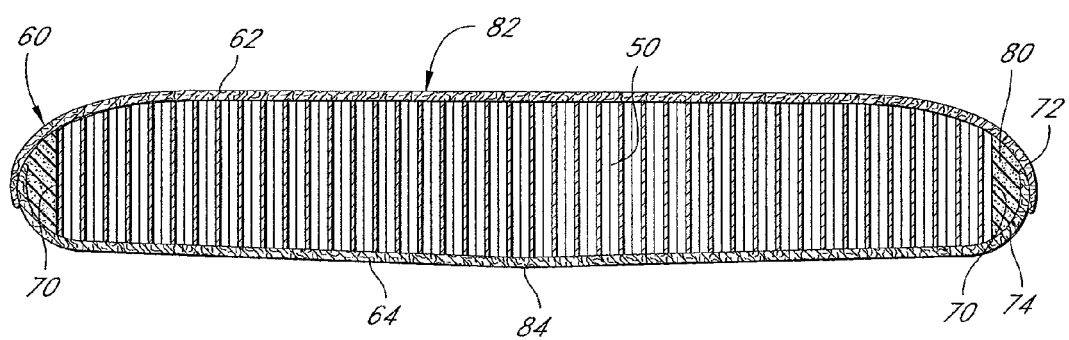
FIG. 3 is a cross-sectional view of the surfboard of FIG. 1 taken along line 3-3.

With initial reference to FIGS. 1-3, an embodiment of a surfboard 30 that incorporates features and aspects of Applicant's invention is illustrated. As illustrated, the surfboard 30 preferably is elongate, and has a nose or tip 32 at a first end and a tail 34 at a second end. A longitudinal axis 36 of the surfboard 30 extends from the tail 34 to the nose 32. An upper side or deck 37 of the surfboard 30 is configured to support the weight of a rider. A bottom side or hull 38 of the surfboard 30 is configured to engage a surface of the body of water upon which the surfboard 30 is ridden.

Opposing edges or rails 40 of the board 30 make up a transition between the deck 37 and bottom 38 of the board and extend from the nose 32 to the tail 34. The width of the board 30 between the opposing rails 40 changes along its length. As illustrated, the width of the surfboard 30 preferably is the least at the nose 32 of the board and increases gradually along the length of the board to its widest point in a center section of the board. From the widest point, the width of the board gradually trails off again towards the tail 34.

In the illustrated embodiment, the surfboard 30 retains significant width at the tail 34, and the rails 40 curve at a transition 42 into the tail section. Such a tail as illustrated is known in the industry as a "squash" tail. Other types of tails are also contemplated, for example, square-, swallow-, round-, and pin-tail styles may also be used, as well as other desired tail styles. Furthermore, in the illustrated embodiment, the width of the board changes generally gradually. It is to be understood that in other embodiments, the rails may include generally abrupt offsets, known in the industry as "wings," which make small, but abrupt, changes in the width of the board.

With particular reference to FIG. 2, the bottom portion 38 of the surfboard 30 includes a substantial curve along its length. The curve of the bottom 38 from the nose 32 to the tail 34 is known in the industry as the rocker 44 of the surfboard 30, and has implications with regard to a surfboard turning performance. As illustrated, the thickness of the surfboard between the deck 37 and bottom 38 surfaces varies along its length from the nose 32 to the tail 34. The surfboard 30 typically is thickest at and around the center section of the board, and thins towards both the nose and tail.

With particular reference to FIG. 3, the thickness of the board preferably also varies across the width of the board. For example, in the illustrated embodiment, the bottom portion 38 of the board has a mild V configuration, which affects certain surfboard performance characteristics that are desired by designers in certain surfboards. Other bottom configurations can also be used, such as a flat bottom, a concave bottom, deep or shallow elongate channels formed into the bottom, V-type configurations that are milder or deeper than in the illustrated embodiment, etc. The deck 37 of the board 30 often also includes some measure of curvature. In the illustrated embodiment, the deck is generally flat, but curves downwardly as it approaches the rails 40. In other embodiments, other deck configurations, such as crowned or concave, may be employed. The rails 40 of the illustrated embodiment are generally rounded. It is to be understood that several styles of rail curvature also may be used by designers, and generally include varied stages and shapes of roundness including sharp and/or gentle curvatures.

With particular reference again to FIG. 2, the illustrated embodiment contemplates a surfboard 30 having fins 46 that aid in surfboard control and turning. In a preferred embodiment, a thruster, or three-fin, configuration is employed. It is to be understood that any fin configuration, such as a single fin, twin fin, four-, five- or more fin configurations can be employed.

The surfboard 30 embodiment of FIG. 1 illustrates the general configuration of a representative sample of a typical high performance "shortboard" type of surfboard. Such boards can be constructed in a variety of lengths, widths, and thicknesses depending upon rider size, skill, anticipated wave conditions, customized preferences and the like, but are generally less than about 8 feet in length. The illustrated embodiment is an example showing certain surfboard characteristics. Other types and styles of boards may share general surfboard characteristics, but have quite different looks. For example, the "longboard" style of surfboard tends to be much longer than a shortboard and typically has a much flatter rocker. Longboards also typically have "spoon" shaped noses rather than the relatively sharp-tipped nose of the illustrated embodiment. It is not uncommon for longboards to be up to about 144" in length, 30" in maximum width, and 4" in maximum thickness. Also, "gun" type surfboards typically are constructed for very large waves, and tend to resemble a stretched version of the illustrated shortboard, having length characteristics of longboards, but having a relatively narrow width. These and other styles of surfboards may benefit from the features and aspects described herein.

Also, throughout the specification, Applicant will refer to a "typical" or "example" surfboard. Certain calculations and comparisons are made concerning surfboards made of different materials but otherwise substantially identical in shape and dimensions. Some calculations depend on surfboard size and shape, which, as just discussed, can vary nearly infinitely. For consistency in calculations and comparison, Applicant will make certain calculations based on a surfboard resembling the high performance shortboard configuration represented in FIGS. 1-3 and which is about 73" long measured along the curvature of its bottom surface, about 18.5" wide at its widest point, and about 2.25" thick at its thickest point. Such a surfboard has dimensions and shape generally consistent with a high performance surfboard for use in small to medium sized surf.

With continued reference to FIGS. 1-3, the illustrated surfboard 30 comprises a hexagonal aluminum honeycomb core 50 that is encased within a composite skin 60. The composite skin 60 preferably comprises a deck skin portion 62 and a lower skin portion 64 that engage one another so as to enclose the core 50. Preferably, the deck and lower skins 62, 64 are formed of glass fibers suspended in a cured adhesive such as a plastic epoxy resin. Preferably, the honeycomb core 50 is oriented such that longitudinal axes of one or more of the individual hexagonal cells 68 are directed generally perpendicular to the lower portion 64 and/or deck portion 62 of the skin 60.

The illustrated core 50 preferably is machined so as to generally correspond to the surfboard's shape and dimensions. More specifically, edges 70 of the honeycomb core 50 generally approximate and correspond to rail portions 72, 74 of the deck and lower skins 62, 64, and the core 50 extends substantially the full thickness of the surfboard 30 between the deck and lower portions 62, 64, including the variations in thickness along the length and width of the surfboard 30.

With particular reference to FIGS. 1 and 3, preferably an insert 80 is provided along the rails 40 of the surfboard 30 in a space 102 between the edge 70 of the honeycomb core 50 and an internal surface of the skin 60 at the rail 40. The insert 80 preferably provides support in a direction generally transverse to the axes of cells 68 that make up the honeycomb core 50. Most preferably, the insert 80 comprises an expanded foam. It is to be understood, however, that other materials and approaches may be used, such as a honeycomb insert having cells oriented in a direction generally transverse to the rest of the honeycomb core.

In a preferred embodiment, the deck skin and lower skin 62, 64 are separately formed. Each of the deck and lower skins comprises a body portion 82, 84 and a rail portion 72, 74. Preferably, the rail portion 72, 74 is arranged about the edges of the respective skin 62, 64, and the rail curves so as to extend generally transverse to the body portion 82, 84. As such, when the deck skin 62 and lower skin 64 engage one another, their respective rail portions 72, 74 at least partially overlap, as best illustrated in FIG. 3. Such overlapping rail portions may then be adhered together and sanded or otherwise treated so as to produce a smooth rail 40.

Preferably, the composite skin 60 comprises at least one layer of composite material. In the illustrated embodiment, the deck 62 includes a first, inner layer 86 and a second, outer layer 88. The illustrated first layer 86 comprises a weave of glass fibers having a weight of about 3.7 oz/yd^2 oriented in a generally 0°/90° orientation relative to the longitudinal axis 36 of the board 30. The second layer 88 preferably comprises a first portion 90 comprising a glass fiber weave oriented at about 0°/90° relative to the longitudinal axis 36, and a pair of second portions 92, each comprising a weave of glass fibers oriented at about +45°/−45° relative to the longitudinal axis 36. Preferably, the first portion 90 is located generally in the body 82 of the deck 62, and the second portions 92 are arranged generally along the rails 72 of the deck 62. In a preferred embodiment, about ⅔ of the width of the deck 62 comprises the 0°/90° oriented weave, and about ⅙ of the width along each edge or rail 72 of the deck comprises the +45°/−45° oriented weave.

Continuing with reference to FIGS. 1 and 3, preferably the illustrated lower skin 74 has a laminate structure substantially similar to the deck skin 72. However, it is to be understood that, in other embodiments, other configurations can be employed. For example, the lower skin may comprise only a single-layer glass fiber weave oriented at about 0°/90° relative to the longitudinal axis.

In a preferred embodiment, the glass fibers comprise S glass fibers that are encased in a resin known as "rubber toughened epoxy", which is available from Applied Poleramic of Benicia, Calif. The rubber toughened epoxy includes rubber molecules in the epoxy network, increasing the toughness of the skin and resisting brittleness. As such, the epoxy will withstand significant flexing the surfboard, as well as the incidental bumps that inevitably occur when handling a surfboard both in and out of water, without cracking as is typical with thermo setting epoxies. It is to be understood that other materials can be used including, for example, E glass fibers, aramid (Kevlar™) fibers, carbon fibers, ultra-high molecular weight polyethylene fibers or the like. Additionally, other acceptable matrices may include standard epoxy resins, polyester resins, vinylester resins, and the like. Such resins may also be toughened through the use of secondary-phase rubber particles or the like.

During manufacture according to one embodiment, the deck and bottom skins 62, 64 are first separately formed in respective molds that have been shaped to create the desired surfboard shape and measurements. In such manufacture, the deck and bottom skins 62, 64 can be formed by traditional composite processes such as a conventional fiberglass wet layup method, a resin transfer molding (RTM) method, a vacuum-assisted resin transfer molding method (VARTM), or even by including fiberglass plies that have been pre-impregnated with a resin (pre-preg) and then cured under elevated pressure in an autoclave.

Applicant has determined that a typical fiberglass wet layup results in a composite comprising about 88%-90% volume resin relative to the fibers. This resin content can be reduced by certain procedures, such as by enclosing the layup in a bag and drawing a vacuum in order to remove a portion of the epoxy depending on the intensity with which the vacuum is drawn. As such, through a vacuum bag wet layup and/or through a traditional RTM, VARTM, or prepreg process, Applicant anticipates the skins will be less than about 85% volume resin content.

In a more preferred embodiment, the skins have a resin content less than about 75% by volume. In a still further preferred embodiment, the skins have a resin content less than about 65% by volume and, in a yet further preferred embodiment, less than about 60% by volume. In a still further preferred embodiment, a VARTM process is used to produce skins. By the use of other processes, such as the pre-preg autoclave process, Applicant anticipates that skins having a resin content as low as about 35% by volume, or even less, may be achieved. In a particularly preferred embodiment, however, a VARTM process is used to produce skins having a resin content between about 50%-60% by volume and most preferably about 55% resin content by volume. Since the VARTM process is versatile and cost effective while still producing a relatively light weight and durable skin, Applicant considers it a good balance of factors to produce a surfboard meeting goals of light weight, flexibility, durability, and cost effectiveness.

Preferably, the aluminum honeycomb core 50 is machined as discussed above so as to complement the shape of the cured skins 62, 64. An aluminum honeycomb sheet tends to be generally flexible, and such flexibility may be considered in machining the honeycomb core. The machined core may flex to fit in, for example, the curving bottom skin portion 64, which has a curve that defines the rocker 44 of the surfboard 30.

Figure 4:
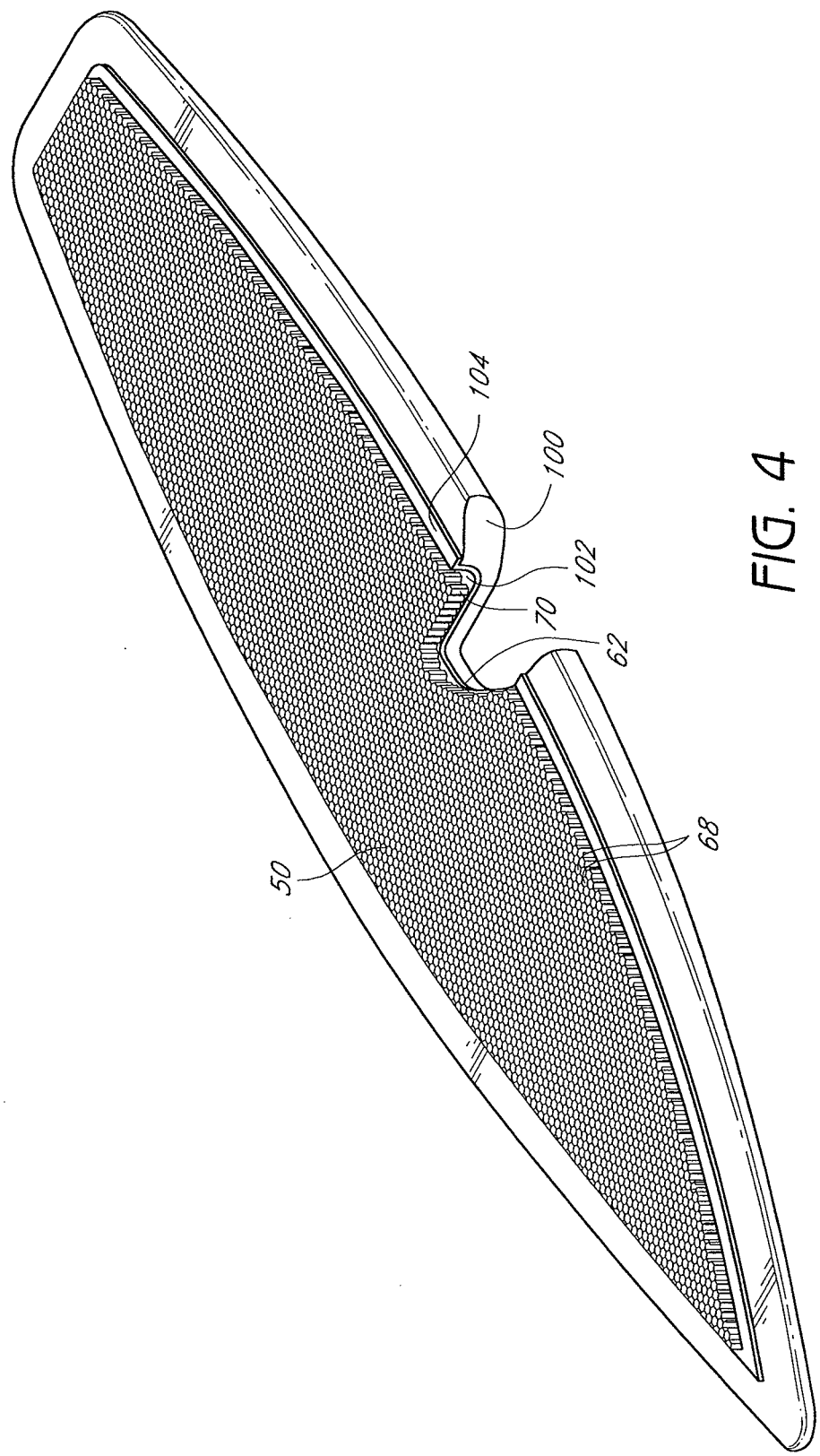
FIG. 4 is a partly-cutaway perspective view of a partially-assembled surfboard during the manufacturing process, showing an aluminum honeycomb core disposed on a bottom skin.

With specific reference to FIG. 4, the bottom skin 64 is illustrated as supported in a mold 100. The machined aluminum honeycomb core 50 has been placed in the bottom skin 64. As shown, a space 102 is disposed between the edges 70 of the core 50 and the rail portion 74 of the bottom skin 62. Preferably each of the deck and bottom skin portions 62, 64, when initially manufactured, include a flange 104 extending generally transversely from the rail portion 72, 74 of the respective skins 62, 64. The flange portion 104 of the skin 64 extends outwardly from the rail 74, and assists in certain manufacturing processes such as securing the skin 64 and core 50 on the mold 100. Preferably, the core 50 is adhered to the bottom skin 64 using any desirable and acceptable type of adhesive, including epoxy-based adhesives available from Hexcel Corporation of Stamford, Conn.

Figure 5:
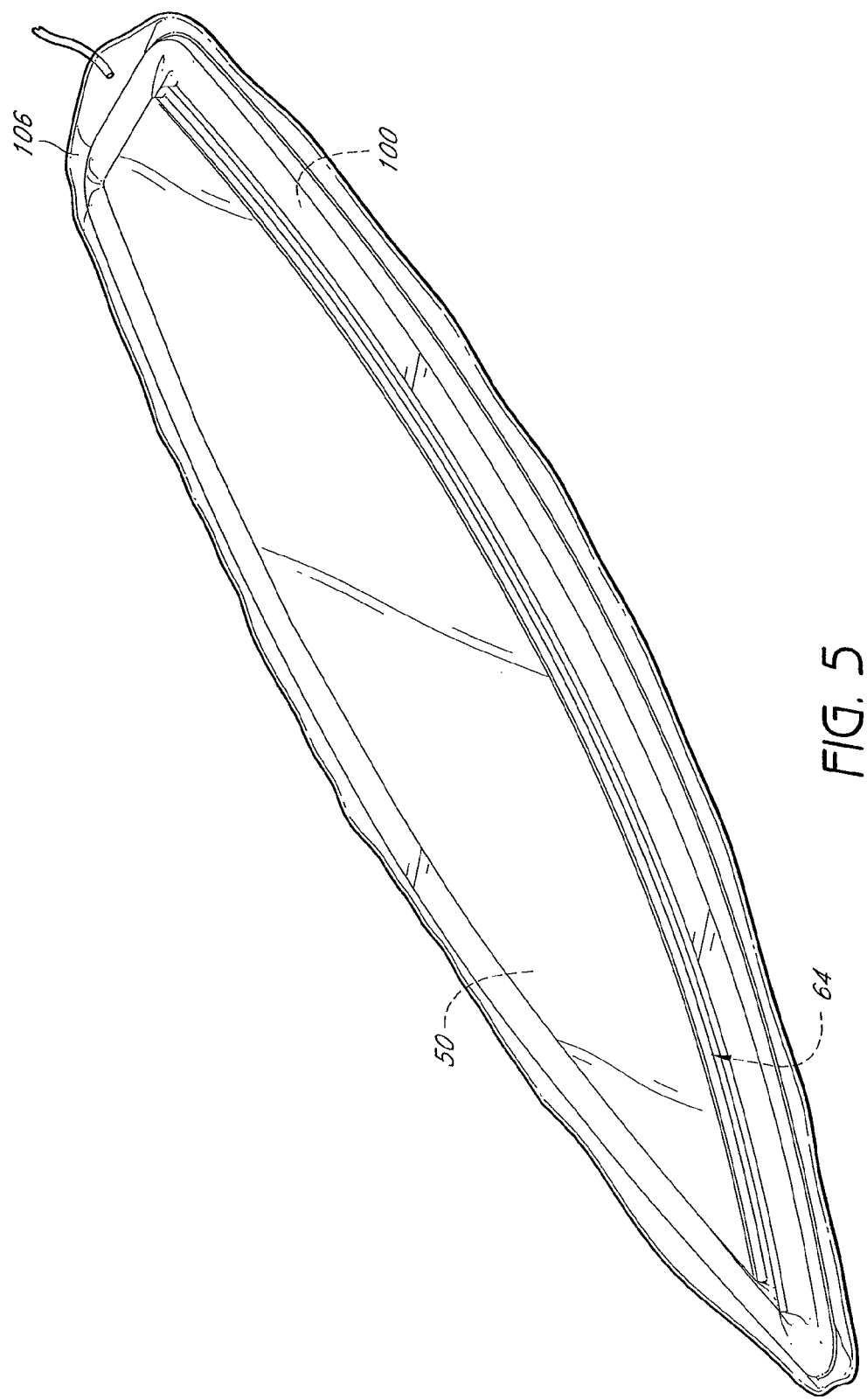
FIG. 5 is a view during the manufacturing process of a surfboard showing a vacuum bag enclosing the assembly of FIG. 4.

With initial reference to FIG. 5, to adhere the core 50 onto the skin 64, preferably the adhesive is applied to the skin 64, the core 50 is put in place, a vacuum bag 106 is arranged over the assembly, and a vacuum is drawn as the adhesive cures. Such a process tightly adheres the core 50 into place against the skin 64 and enhances durability of the finished product.

Once the core 50 is firmly adhered to the bottom skin 64, preferably an expanding foam 80 is applied in the space 102 between the edge 70 of the core 50 and the rail portion 74 of the lower skin 64, and the flange 104 is removed. The flange is also removed from the deck skin 62. Adhesive is applied to the deck skin 62 and the deck skin is installed over the core 50 and arranged so that the deck skin rail 72 at least partially overlaps the bottom skin rail 74. The assembly is then vacuumed bagged and allowed to cure. Preferably, it is cured with the deck side down so that the curing epoxy remains in place at the deck/core interface. Also, preferably, heat or another type of catalyst is applied so as to expand the foam, which will expand to fill the space 102 between the rails 72, 74 and the edge 70 of the honeycomb core 50. Such perfect correspondence of the expanded foam creates a durable and sturdy rail structure.

In accordance with one embodiment, the deck skin rails 72 are formed so as to require some deflection in order to fit over and engage the bottom skin rails 74. This arrangement promotes a snug fit onto the bottom skin rails, as tension is imparted to the deck rails when they are deflected to fit over the bottom rails. This arrangement, in addition to the application of adhesive, enhances the fit and seal between the deck and bottom 62, 64.

Although the illustrated embodiment employs a vacuum bag 106, it is to be understood that other embodiments may dispense with such a vacuum bag. Further, other embodiments may be even more involved, for example, using clamps, an autoclave, high heat application, and/or application of pressure through any alternative method, or a combination thereof.

Preferably the cells 68 of the honeycomb core 50 are substantially hollow, thus minimizing the weight of the core. Further, preferably the adhesive engagement between the core 50 and skins 62, 64 is consistent and thorough so that individual cells 68 of the honeycomb are substantially sealed relative to one another. As such, in the event of localized failure, such as accidental damage to the surfboard 30, invasion of water into the core will be limited to directly-affected cells.

In another embodiment, at least some of the cells 68 are at least partially filled with a high density foam. Such an arrangement adds weight strategically to particular portions of the surfboard so as to affect the moment of inertia of the surfboard. For example, in one embodiment, a plurality of cells near opposing rails 40 of a surfboard are filled with high density foam. As such, the resulting surfboard has a greater moment of inertia in side-to-side rocking of the surfboard, resulting in increased surfboard stability. In another embodiment, high density foam is added to cells generally at the middle of the surfboard's width, but behind the longitudinal center of the board. This arrangement shifts the center of gravity of the surfboard rearwardly, creating a sort of "pivot" for turning the surfboard, which may be desirable in certain conditions and for certain surfing styles. Of course, other locations of selective weight distribution may be made as desired by surfers and board designers.

Figure 6:
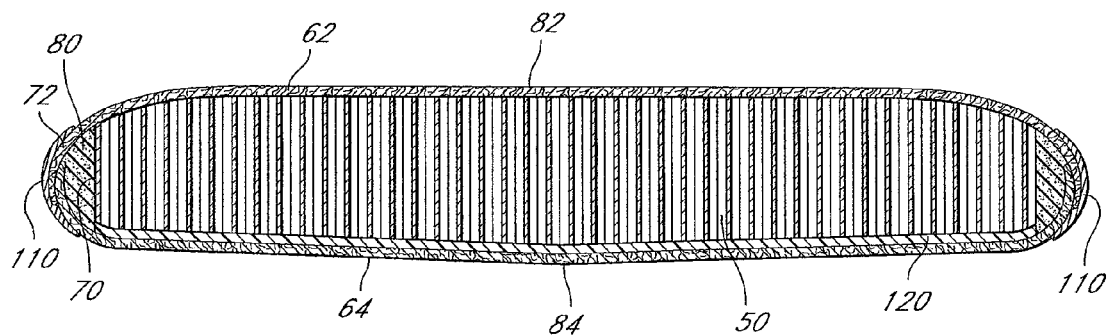
FIG. 6 is a cross sectional view of another embodiment of a surfboard.

With reference next to FIG. 6, in another embodiment, a composite layer 110 comprising aramid fibers is applied to an outer surface of the rail 40 over the overlapping top and bottom skin rails 72, 74. Aramid fibers are known to have advantageous impact resistance characteristics, and employing aramid fibers at the rail enhances rail durability. In still further embodiments, in lieu of or in addition to a layer of aramid added to the rail, aramid fibers may be included in the deck and/or bottom skin plies that are applied adjacent the rail, and such aramid fibers may be intermixed with glass fibers.

With continued reference to FIG. 6, in another embodiment, a viscoelastic damping layer 120 is arranged inside the composite skin 60, and preferably is in contact with the honeycomb core 50. In the illustrated embodiment, the damping layer 120 is adhered to at least part of an inner surface of the bottom skin 64 by using a strong adhesive such as isocyanate-based adhesives. The damping layer 120 may alternatively be adhered directly to the aluminum core 50. The viscoelastic damping layer 120 will absorb energy when loaded or unloaded, thus damping the effects of natural resonance frequencies of the surfboard or its component parts. Preferably, the damping layer 120 comprises a polymer having a glass-transition temperature below the coldest ocean temperatures (approximately 0° C.) and preferably has a natural resonance frequency relatively close to that of a surfboard so as to provide optimal damping. In a preferred embodiment, a surfboard, and the dampening layer, has a resonance frequency of about 9-13 hertz, more preferably between about 10-12 hertz, and most preferably about 11 hertz.

In the illustrated embodiment, the viscoelastic layer 120 is applied only to a portion of the bottom skin 64. In other embodiments, the viscoleastic layer can be applied only to the deck or to both the deck and bottom skins and can extend around the entire cross-sectional circumference of the surfboard skin.

Figure 7:
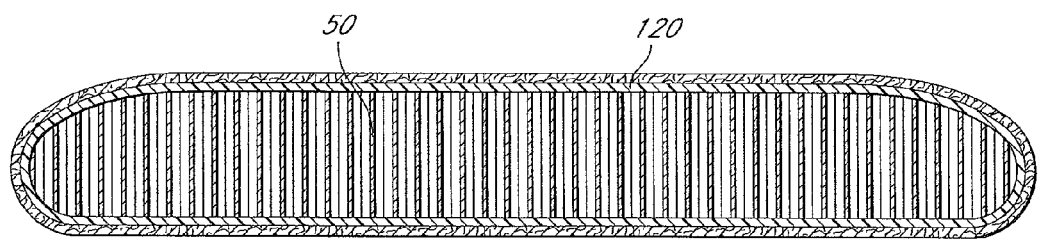
FIG. 7 is a cross sectional view of still another embodiment of a surfboard.

With reference next to FIG. 7, yet another embodiment is illustrated in which the aluminum honeycomb core 50 is machined to extend all the way from rail to rail of the skin 60 and without requiring inserts at the rail. Additionally, in the illustrated embodiment, rather than comprising separately-formed deck and bottom skins that are assembled together, the embodiment comprises a single unitarily-formed skin 60 such as can be formed by wrapping the core 50 with composite material. Similarly, a viscoelastic material 120 may be disposed substantially around the entire core.

Additional embodiments may include additional features. For example, in one embodiment, one or more additional plies of composite fibers is applied to selected portions of the deck where the surfer is likely to place his feet during riding so as to provide further support. In another embodiment, a foam pad is adhered to at least a portion of the deck both to provide further support and to provide increased comfort and traction for the feet of the rider.

The structure according to the above embodiments may be fine-tuned to accomplish Applicant's goals of a light weight, flexible, strong and cost-effective surfboard 30. Through extensive research, Applicant has learned that although an important weakness of traditional foam/fiberglass surfboards is their fragility and weakness, especially in strong surf, such boards provide a high performance advantage due to their flexibility, particularly their flexibility in longitudinal bending. Applicant has noted that highly skilled, high performance surfers typically pan the performance of boards that are comparatively stiff, even if such boards are very strong and have weight comparable to traditional foam/fiberglass boards. As such, Applicant has determined that a decreased-weight surfboard that is stronger in resisting breakage, but retains or even enhances the flexibility of a comparable traditional foam/fiberglass surfboard, would significantly improve high-performance surfboard technology.

In order to produce a surfboard 30 that is in line with his findings, Applicant has conducted extensive research into the failure modes and design of surfboards in order to create a surfboard that has increased strength relative to a traditional foam/fiberglass surfboard, but which imitates the flexibility characteristics of such a traditional surfboard. In a further embodiment, the flexibility of a surfboard is increased relative to the flexibility of a traditional foam/fiberglass surfboard, especially in longitudinal bending. In yet another embodiment, Applicant enables surfboard designers to customize flexibility design by selective arrangement of directional fibers in the deck and lower skins 62, 64 of a surfboard 30 while increasing strength and maintaining or reducing weight relative to a traditional foam/fiberglass board.

A description of some of Applicant's research follows. Further embodiments employing aspects of the above-described structural embodiments have been optimized while maintaining cost-effectiveness by employing findings from Applicant's research.

Surfboard Breakage

Composite structures are known for their superior strength in bending. The notable strength of such structures is obtained from their fibers rather than in the matrix. Their strength properties are best employed when the structure does not fail unless and until fibers within the structure fail rather than a core failure or matrix-based failure.

Figure 8:
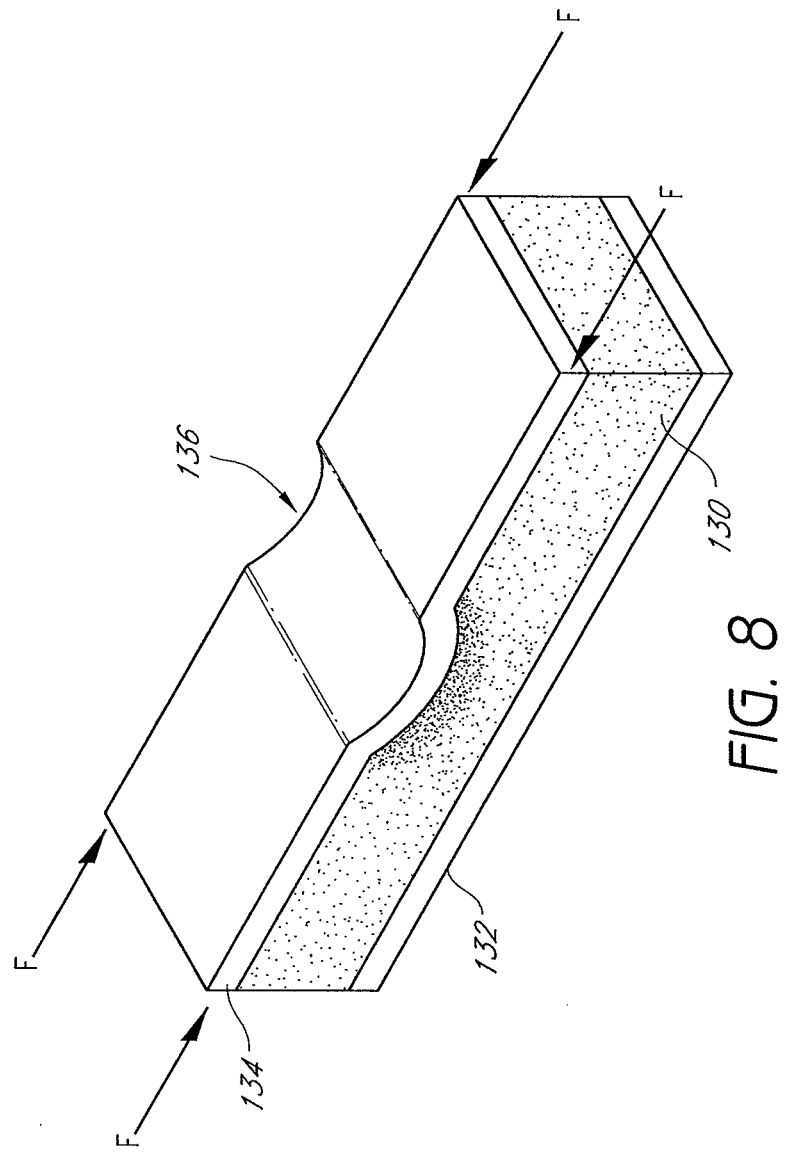
FIG. 8 is a schematic view illustrating how a material having opposing skins fails in a skin wrinkling mode.

With reference to FIG. 8, Applicant's analysis has determined traditional foam/fiberglass surfboards break in bending conditions when the fiberglass laminate buckles into the foam core 130 beneath it. More specifically, in the illustrated embodiment, when under a bending load the fibers in the bottom skin 132 are under tension forces while the top skin 134 is under compression forces F. However, the foam 130 is not sufficiently rigid so as to hold the stressed laminate in place, and the portion 136 of the top skin 134 buckles into the foam core 130, leading to failure of the skin laminate. If the fiberglass laminate had been more rigidly supported by the core, the composite laminate would have been able to bear a greater compressive load. Thus, this type of failure is a premature failure of the composite laminate. In the study of composite sandwiched structures, this type of failure mode is known as "skin wrinkling."

Skin wrinkling is known to occur at predictable compressive stresses. The published equation predicting for the stress at which skin wrinkling occurs is:

$$\sigma w = 0.5 [Gc \, Ec \, Ef]^{(1/3)} \quad (1)$$

In equation (1):
  σw is the critical stress at which skin wrinkling is likely to occur;
  Gc is the shear modulus of the core;
  Ec is the compressive modulus of the core; and
  Ef is the Young's modulus of the composite skin.

In a traditional foam (expanded polyurethane foam)/fiberglass (S glass in epoxy matrix) surfboard, the following values are expected:
  Gc≈404 psi
  Ef≈2.21*10^6 psi
  Ec≈1,726 psi In accordance with equation (1), the critical skin wrinkling stress σw in a traditional surfboard≈4,794 psi.

A thin wooden spar or "stringer" usually is glued into the centerline of the foam core in a traditional surfboard in order improve the board's strength and resistance to skin wrinkling. It is estimated that the spar increases the critical stress σw by a factor of 1.5. As such, it can be calculated that traditional foam/fiberglass surfboards fail in a skin wrinkling mode when the skin stress from a bending load reaches about 7,191 psi.

Attempts to Improve Surfboard Strength

One method to increase surfboard strength is to replace fiberglass with a stiffer fiber reinforcement material, thereby increasing Ef. For example, a high-strength surfboard may employ carbon fibers in the skin. The Young's Modulus (Ef) of carbon fiber generally is about 3 or more times greater than that of fiberglass.

The contribution of the skins to the bending stiffness of a composite sandwich structure is defined according to the following equation:

$$\text{Bending Stiffness} = Ef * b / 12 * (h^3 - hc^3) \quad (2)$$

In equation (2):
  b=base width;
  h=total height of sandwich structure; and
  hc=height of core.

The relative bending stiffnesses of two surfboards having the same dimensions is determined primarily by the relative stiffnesses of the two skin facings (Ef). Increasing the stiffness of the skin facing (such as by using carbon fiber rather than fiberglass) improves the wrinkling resistance of the surfboard, but also increases bending stiffness. Addition of a wooden spar (stringer) is estimated to contribute 10-15% to the bending stiffness of a foam/fiberglass surfboard. Increasing the number of wooden spars also increases the overall bending stiffness of the surfboard.

Increasing bending stiffness decreases surfboard flexibility. As discussed above, surfboards that lack flexibility do not maneuver as well as the more flexible traditional foam/fiberglass surfboards, and are therefore not a desired alternative for most high-performance surfboard applications. In one test, Applicant measured the bending flexibility of an example foam/fiberglass surfboard to be about 0.35 inches when a five pound weight was hung from a point near the nose and the board was clamped 10 inches from its tail end. Advantageously, an example honeycomb/fiberglass surfboard will achieve similar flex while enjoying enhanced breakage resistance and lighter weight.

Notably, even when using the same fiberglass material having the same Ef, increasing the thickness of the skin increases bending stiffness as calculated by Equation (2).

Increasing Strength without Sacrificing Flexibility

In accordance with one embodiment, to strengthen surfboards while minimizing or avoiding increasing the bending stiffness, Gc and Ec are increased without increasing Ef. More spars (stringers) can be glued into a foam core to further increase the skin wrinkling resistance of surfboards, but this adds significant weight and, as mentioned above, also decreases flexibility. In a particularly preferred embodiment, the skin reinforcement remains fiberglass (or a material having similar properties) while the core material is changed.

As discussed above in connection with the preferred embodiments, Applicant preferably uses a surfboard core 50 made of honeycomb to increase skin wrinkling resistance. Two preferred types of honeycomb that are commonly used in sandwich structures are aluminum and Nomex. Nomex honeycomb is made from an aramid fiber dipped in resin. Although Nomex is known to have certain mechanical properties that are superior to aluminum, it is 2-5 times more expensive than aluminum honeycomb. As such, in order to achieve Applicant's goal of cost effectiveness, there is a motivation to engineer a high strength, flexible, lightweight surfboard that employs an aluminum honeycomb core. Nevertheless, other honeycomb materials, such as Nomex, fiberglass, and others, can be used in accordance with some embodiments.

Three main variables in selecting aluminum honeycomb are cell size, foil thickness, and alloy composition. Through calculations, Applicant has determined that several aluminum honeycombs will increase the critical skin wrinkling stress σw of a surfboard dramatically. For example, for an aluminum honeycomb with a cell size of 3/8" and a ribbon thickness of 0.0007", Ec=10*10^3 psi and Gc=7*10^3 psi. A surfboard constructed of such an a 5052 aluminum alloy honeycomb core but having fiberglass skins identical to the skins of a traditional foam/fiberglass surfboard, would have a skin wrinkling resistance of about 22,286 psi (over three times greater than a foam-cored surfboard). Notably, however, none of the factors in the bending stiffness Equation (2), are changed. Thus, flexibility of such an aluminum honeycomb core surfboard would be substantially the same as a comparable foam/fiberglass surfboard.

In accordance with one embodiment, in order to maintain the flexibility of a traditional surfboard, the thickness of the fiberglass skin preferably is similar to that of a traditional surfboard, which is typically about 0.006"-0.10" thick depending on the number of plies and the resin content. A lightweight, high performance surfboard may be expected to have a skin thickness less than about 0.05" thick. Surfboards manufactured so as to have reduced resin content in the skin may expect a still further reduced skin thickness. For example, using a VARTM process for skin formation may yield a 2-ply laminate about 0.03" thick or less, more preferably about 0.02" thick or less, and most preferably about 0.013" thick or less; and a 1-ply laminate similarly as thin, and as low as about 0.0006" thick.

Figure 9:
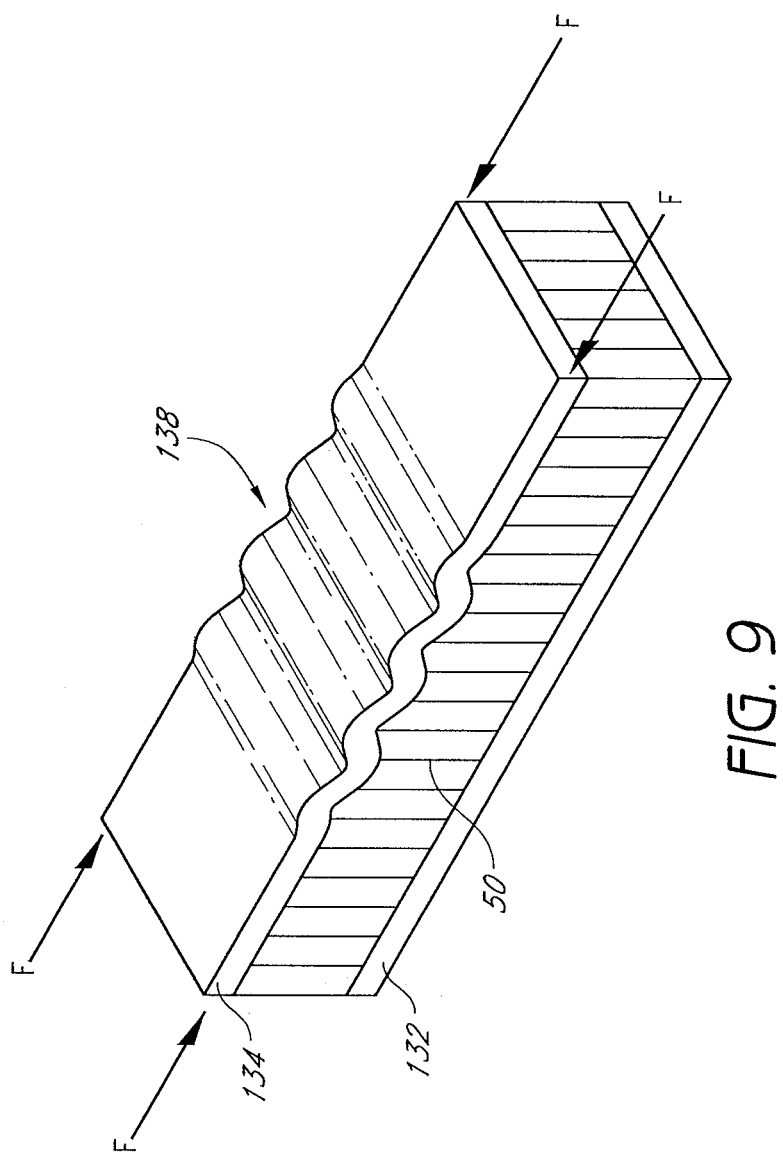
FIG. 9 is a schematic view illustrating how a honeycomb core material having opposing skins fails in a skin wrinkling mode in an intracell dimpling.

When thin skins (such as about 0.0006"-0.03" thick for resin-reduced processes, up to about 0.05" thick for typical wet layup boards, or up to 0.10" thick for larger surfboards such as longboards) are used in conjunction with a full-thickness honeycomb core, a different type of failure may occur. This failure mode, known as "intracell buckling", involves the skins buckling into and out of the honeycomb cells. Specifically, and with reference to FIG. 9, upon bending, portions of the skin 132, 134 that are not directly supported by foils of the honeycomb 30 may deflect inwardly, resulting in dimpling. If the magnitude of such dimpling is sufficient, localized buckling 138 of the laminate at these dimpled portions may occur.

For sandwich structures employing celled cores, intracell buckling is predicted to occur at a critical stress predicted by the following equation:

$$\sigma b = 2 * Ef * (Tf/s)^2 \quad (3)$$

where:
$\sigma b$=critical stress for intracell buckling;
Tf=thickness of skins; and
s=cell size.

For the ⅜" cell size honeycomb listed above laminated with 0.006" thick fiberglass skins, $\sigma b$ (⅜")=1,131 psi, which is less than ⅙$^{th}$ the critical stress of a comparable foam/fiberglass surfboard. For a ⅛" cell-sized honeycomb laminated with a 0.006" thick fiberglass skin, $\sigma b$ (⅛")=10,183 psi, which is about 1.4 times the critical stress of a foam/fiberglass surfboard. For a 3/16" cell-sized honeycomb laminated with a 0.006" thick fiberglass skin, $\sigma b$ (3/16")=4,526 psi, which is only 63% of the critical stress of a traditional surfboard.

The smallest commercially-available cell size available in aluminum honeycomb is 1/16". However, the lowest density of 1/16" cell-size honeycomb is 6.5 lbs./ft^3. Lightweight surfboard foam is typically only about 2.9 lbs./ft^3, so using a 1/16" cell aluminum honeycomb would make a board that is much heavier than a comparable foam/fiberglass board.

The 3/16" cell-size honeycomb has a density of only 2.0 lb/ft^3, which would create dramatic weight savings over a traditional foam core. However, this core is predicted to provide only about 63% of the critical stress of a traditional foam/fiberglass surfboard.

The density of a ⅛" cell-size honeycomb having a foil thickness of only 0.0007" is about 3.1 lb/ft^3, which is similar to the density of the lightweight traditional foam. Thus, equation (3) predicts a strength enhancement factor of about 1.4, but little or no weight savings relative to a traditional foam/fiberglass surfboard.

As such, equation (3) predicts very limited options of honeycomb sizes if a designer wishes to strengthen the surfboard by using an aluminum honeycomb core. Since the material and processing costs for a honeycomb-core surfboard are much greater than for a traditional foam-core surfboard, the modest predicted strength increase for a ⅛" cell-size honeycomb likely does not justify the expense of its implementation.

Figure 10:
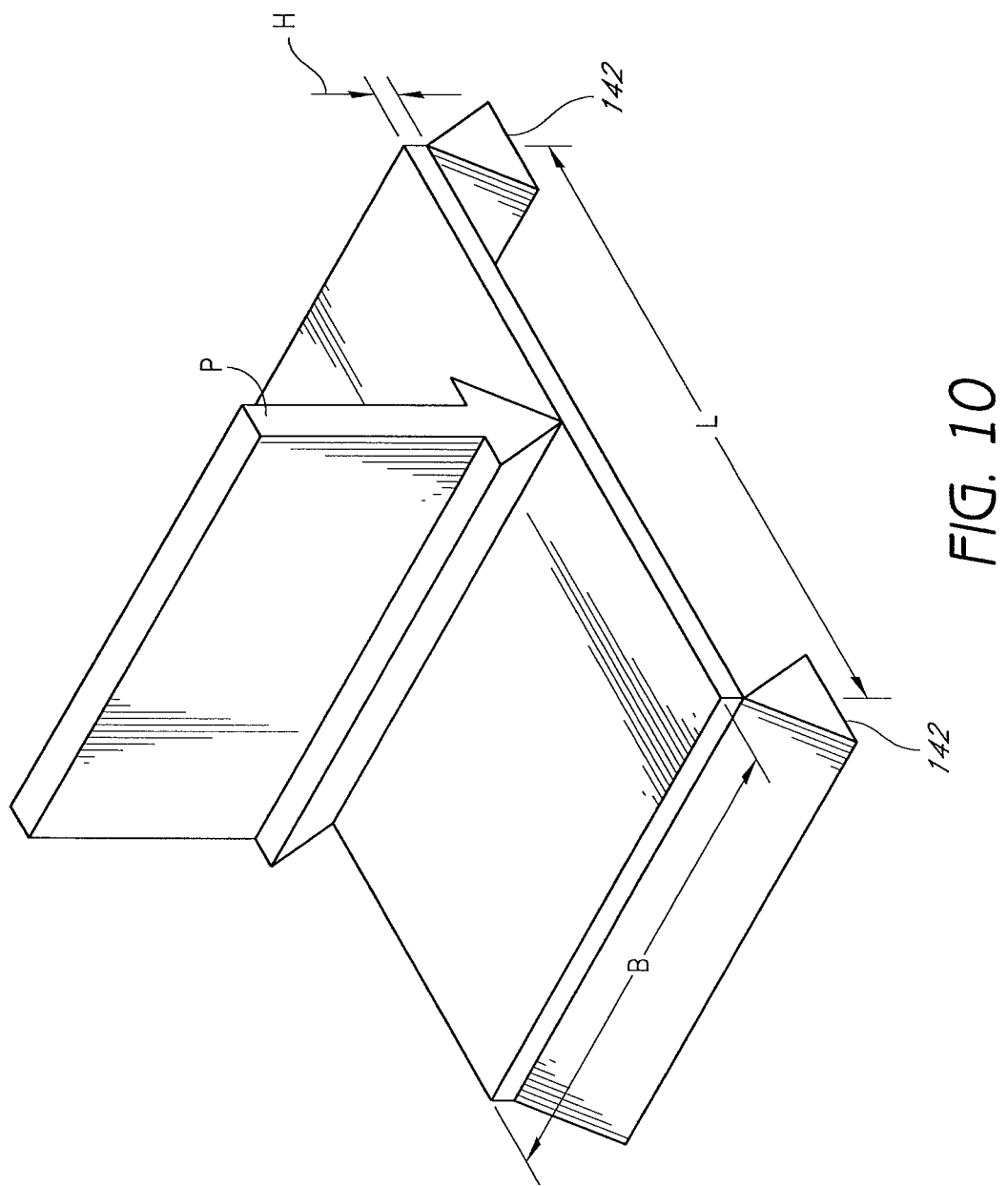
FIG. 10 is a schematic drawing illustrating a conventional three-point stress test configuration.

Notwithstanding the discouraging predictions of equation (3), Applicant tested aluminum honeycomb sandwich structures comprising fiberglass skins. With next reference to FIG. 10, Applicant conducted a standard three-point Instron bending test of a sample laminated beam 140 employing a ⅛" cell-size aluminum honeycomb having a 0.0007" foil thickness and having 0.006" thick (Tf) fiberglass skins. The tests yielded a load (P) at failure of 305 lb. for a setup employing a distance (L) between supports 142 of 18", a beam thickness (H) of 2" and a beam width (B) of 6".

The calculation of the failure stress in the laminate for such a test is:

$$\sigma f = (P*L/4)/(H*Tf*B) \quad (4)$$

Thus, the test demonstrated $\sigma f$ at failure=19,005 psi.

Equation (3) predicted that the critical failure stress for intracell buckling of the sample beam would be 10,183 psi. However, actual failure did not occur until the laminate stresses reached 19,005 psi. Further, from examining the beam, Applicant noted that the failure resulted from core crushing under the load cell (see FIG. 11) rather than intracell buckling. As such, Applicant has discovered that, for relatively small cell-size aluminum honeycomb sandwiched between thin fiberglass skins, the generally-accepted equation for predicting intracell buckling is not accurate.

Based on the test results for ⅛" cell-size aluminum, including the failure mode (core crushing), Applicant anticipated intracell dimpling may not be an issue at a 3/16" cell size, and proceeded to test a sample beam comprising a 3/16" cell-size aluminum honeycomb having a foil thickness of 0.0007" sandwiched between 0.006" thick fiberglass skins. Applicant used a four-point Instron setup to spread the load between two knife blades and thereby avoid the core crushing of the earlier tests for the ⅛" cell-size. Testing of several samples resulted in an average intracell dimpling mode failure of the laminate at about 17,360 psi. Notably, equation (3) predicts a laminate failure stress of 4,526 psi. As such, Applicant has determined actual strength performance is about four times the values predicted by equation (3).

Applicant's discovery effectively expands the range of honeycomb core materials that may effectively be used in constructing surfboard embodiments. Applicant contemplates that aluminum honeycomb materials having a cell-size of ⅜" or less may effectively be used for some embodiments of a surfboard core 50. Aluminum honeycomb core materials are available from Hexcel Corporation in cell sizes such as ⅜", ¼", 3/16", 5/32", and ⅛", each of which are contemplated to be suitable for advantageous embodiments. Also, various aluminum alloys, such as 5052 and 5056, may be used.

For example, as discussed above, an example foam/fiberglass surfboard employs a foam core having a density of about 2.9 lb./ft^3. An example surfboard made from such a core will weigh about 6 lb. In some preferred embodiments, an example honeycomb-core surfboard weighs less than its traditional counterpart. For example, an example surfboard 30 having a 3/16" cell-size aluminum honeycomb core 50 encased in a fiberglass skin 60 having a resin content of about 50-60% volume can be expected to have a weight of about 3.5 pounds. In other preferred embodiments, an equivalent-weight honeycomb surfboard with increased strength and similar or enhance flexibility than its traditional counterpart is acceptable.

In some preferred embodiments, an aluminum honeycomb core 50 having a density at most about 2.9 lb./ft^3 is used to produce a reduced-weight surfboard 30. In other embodiments, an aluminum honeycomb core material having a density greater than about 2.9 lb./ft^3 is employed. Preferably, the higher-density core materials are used in conjunction with skins having a resin content lower than that of a traditional fiberglass surfboard skin in which a wet layup is used. As such, resin weight savings from the reduced-weight skins compensates for any increased weight due to density to create a surfboard having a weight about the same as a comparable foam/fiberglass surfboard. In accordance with a preferred embodiment, the aluminum core material has a density less than about 4.5 lb./ft^3, and is used in conjunction with a skin constructed with a relatively low resin percent volume in order to produce an increased-strength high performance surfboard that is not substantially heavier than a comparable traditional foam/fiberglass surfboard.

Preferred embodiments include a ⅜" cell-size aluminum honeycomb core having a foil thickness of about 0.003" or less, a ¼" cell-size aluminum honeycomb core having a foil thickness of about 0.002" or less, a 3/16" cell-size aluminum honeycomb core having a foil thickness of about 0.0015 or less, a 5/32" cell-size aluminum honeycomb core having a foil thickness of about 0.001 or less, and a ⅛" cell-size aluminum honeycomb core having a foil thickness of about 0.001 or less.

In still further preferred embodiments, an aluminum honeycomb core material having a density less than about 3.5 lb./ft^3 is employed, such as a ⅜" cell-size aluminum honeycomb core having a foil thickness of about 0.002" or less, a ¼" cell-size aluminum honeycomb core having a foil thickness of about 0.0015 or less, a 3/16" cell-size aluminum honeycomb core having a foil thickness of about 0.001" or less, a 5/32" cell-size aluminum honeycomb core having a foil thickness of about 0.0007" or less, or a ⅛" cell-size aluminum honeycomb core having a foil thickness of about 0.0007" or less.

As discussed above, preferably the surfboard skin 60 is configured so as to imitate and/or improve on the flexibility characteristics of a traditional foam/fiberglass surfboard. As discussed above, such fiberglass skins can be constructed according to several methods, such as a traditional wet layup, an RTM process, a VARTM process, or a pre-preg autoclave process. Typically, such fiberglass processing results in skins having thicknesses between about 0.006" and 0.02", depending on the number of plies in the laminate, the resin volume, and the amount of pressure under which the skins were cured. More preferably, the skins are less than about 0.016" thick, and even more preferably are about 0.012" or less thick.

As discussed above, the skin of a traditional foam/fiberglass surfboard can be expected to have a Young's modulus (Ef) of about 2.21*10^6 psi, and a traditional foam core can be expected to have a compressive modulus (Ec) of about 1,726 psi. As such, a skin/core modulus ratio (Ef/Ec) is about 1280. In a preferred embodiment, the skin modulus Ef remains generally the same, but the compressive modulus of the core Ec increases. For example, in an embodiment employing a ⅜" cell-size aluminum honeycomb having a foil gauge of about 0.0007", Ec is about 10*10^3 psi. As such, in this embodiment the skin/core modulus ratio is about 221, which is dramatically less than the skin/core modulus ratio of a traditional foam/fiberglass surfboard.

In more preferred embodiments, Ec is markedly greater. For example, a 3/16" cell-size 5052 aluminum honeycomb core having a foil gauge of about 0.0007" has an Ec of about 34*10^3 psi, yielding a ratio of about 65; a ¼" cell-size 0.001" foil gauge 5052 honeycomb core has an Ec of about 45*10^3 psi, yielding a ratio of about 49; a 5/32" cell-size 0.0007" foil gauge 5052 honeycomb core has an Ec of about 55*10^3 psi, yielding a ratio of about 40; and a ⅛" cell-size, 0.0007" foil gauge 5052 honeycomb core has an Ec of about 75*10^3 psi, yielding a ratio of about 30.

Applicant notes that differing specific cell-size honeycomb structures made of differing materials may be employed in additional embodiments. In light of Applicant's research, a surfboard having strength and flexibility properties in accordance with a preferred embodiment employs skin and core materials chosen so that the skin/core modulus ratio is about 250 or less. More preferably, materials are chosen so that the skin/core modulus ratio is about 100 or less. Even more preferably, materials are chosen so that the skin/core modulus ratio is about 75 or less. Even more preferably, materials are chosen so that the skin/core modulus ratio is about 50 or less. Most preferably, materials are chosen so that the skin/core modulus ratio is about 40 or less.

Notably, such a relationship between the skin and core enable specialty surfboard types to retain relative flexibility characteristics even in specialized situations. For example, a "tow-in" type of surfboard, for use in extremely large surf, is usually fairly thick, stiff and rigid to survive the rigors of such extreme conditions. However, flexibility performance of such a board may be retained within expected high performance parameters when materials chosen to match the ratios discussed above are employed.

Figure 11:
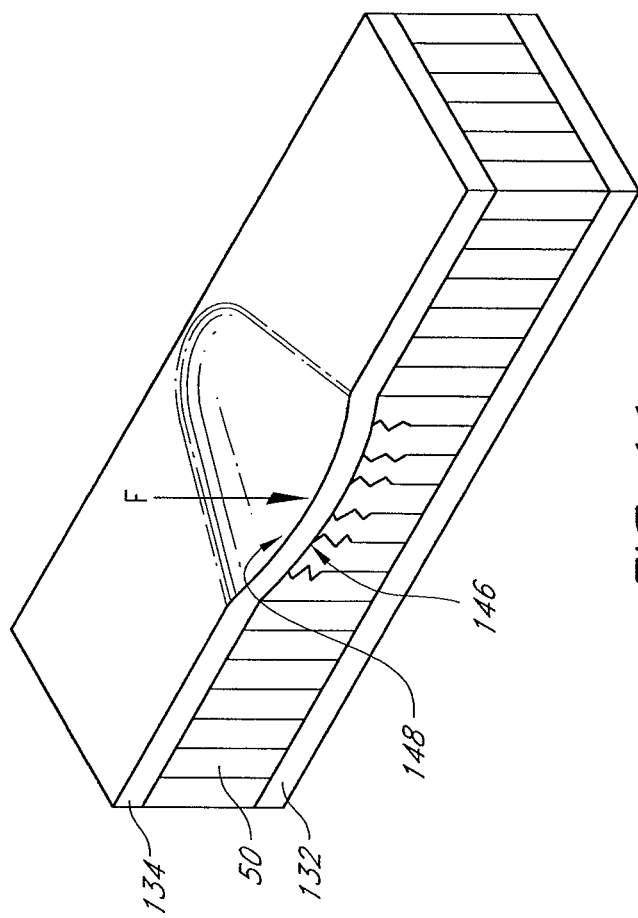
FIG. 11 is a schematic view illustrating how a honeycomb core material having opposing skins fails due to core crushing.

With specific reference to FIG. 11, another possible failure mode of composite sandwich structures is core crushing, in which a concentrated force F applied locally to the skin 134 in a direction generally transverse to the skin can result in crushing of at least a part of the core 146, and localized deflection 148 of the skin 134. For traditional foam/fiberglass surfboards, such core crushing is relatively common, as concentrated forces exerted on the deck of the surfboard, such as from a rider's heel, may create such localized core crushing, which are generally referred to as "pressure dings".

In traditional foam/fiberglass surfboards, the foam core has a compressive strength of about 60 psi. Thus, the foam doesn't offer much resistance to such pressure dings, especially in embodiments employing very thin or low-resin-content skins.

In a surfboard 30 constructed using an aluminum honeycomb core 50 configured to resist failure in skin wrinkling, resistance to localized core crushing substantially aids in maintaining the structural soundness and bending failure resistance of the surfboard. As such, preferably the honeycomb core is selected to have strength sufficient to resist such localized core crushing in surfboard embodiments employing thin, flexible, fiberglass skins 60. Another factor to resist such pressure dings is to consider the rated crush strength (in psi) of the aluminum material.

In a preferred embodiment, a surfboard 30 is constructed having a core 50 formed of a honeycomb core material having a compressive strength at least about 175 psi and a crush strength of at least about 60 psi, such as 3/16" aluminum honeycomb having a foil gauge of 0.0007". In a more preferred embodiment, a surfboard 30 is constructed having a core 50 formed of a honeycomb material having a compressive strength at least about 200 psi and a crush strength of at least about 75 psi. In a most preferred embodiment, a surfboard 30 is constructed having a core 50 formed of a honeycomb material having a compressive strength of about 240 psi or more and a crush strength of about 90 or more, such as a 5/32" aluminum honeycomb having a foil gauge of 0.0007". Even more preferably, the crush strength is about 100 psi or more. In a yet further preferred embodiment, a surfboard 30 is constructed having a core 50 formed of a honeycomb material having a compressive strength at least about 300 psi and a crush strength of about 130 or more, such as ⅛" aluminum honeycomb having a foil gauge of 0.0007".

Figure 12:
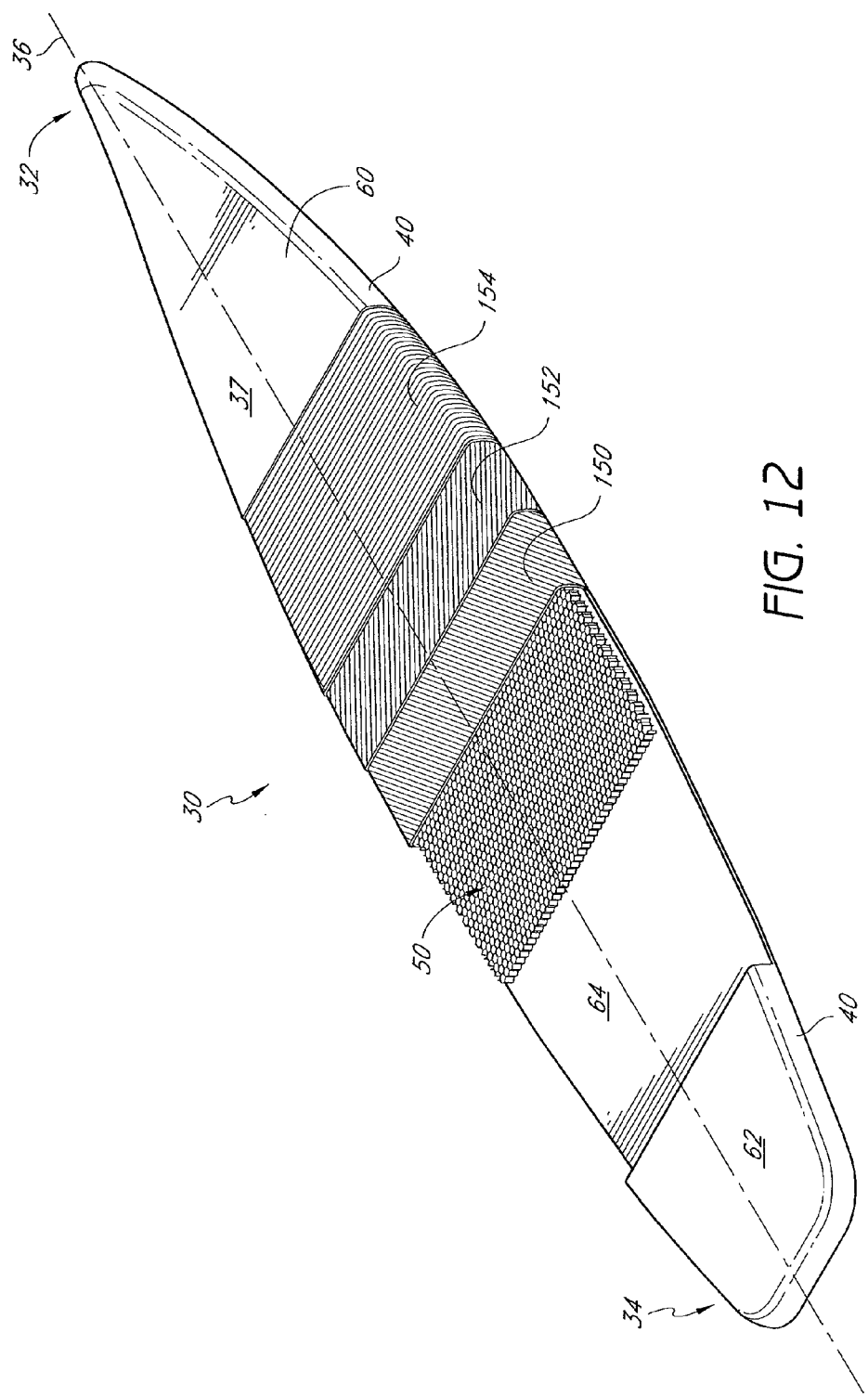
FIG. 12 is a perspective partial cut-away view of one embodiment of a surfboard having features in accordance with the present invention.

With reference next to FIG. 12, another embodiment illustrates another configuration of the composite skin. In the illustrated embodiment, the deck 62 includes two layers 130, 132 of unidirectional S glass plies each arranged at an angle between about 0°-10° relative to the longitudinal axis 36 of the surfboard 30, preferably in opposing configurations relative one another. More preferably, the first two plies 130, 132 are directed at about 5° from the longitudinal axis 36. Preferably a third ply 134 of unidirectional glass is applied over the first two plies 130, 132 generally at about 90° relative to the longitudinal axis 36. In another embodiment, the third ply comprises a woven layer arranged at about 0°/90° relative to the longitudinal axis.

The embodiment illustrated in FIG. 12 shows how the features of the present invention can be customized in order to allow the designer to customize the flexibility properties of a surfboard. For example, by using unidirectional plies arranged at particular angles relative to the longitudinal axis, the surfboard designer can modify and customize surfboard flex.

Although the embodiments discussed in this specification have been surfboards, it is to be understood that other, similar sporting goods can also employ inventive aspect discussed herein. For example, a windsurfer (sailboard), paddleboard, and/or kiteboard can benefit from Applicant's invention.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An aquatic gliding board, comprising:
   a skin extending longitudinally from a tip to a tail and defining a deck, a bottom, and first and second rails, the deck and bottom spaced from one another, the first and second rails each extending between and connecting the deck and bottom so that an enclosed core space is defined by the deck, bottom, first rail and second rail;
   a honeycomb core enclosed within the core space and generally shaped to complement the core space, the honeycomb core being elongate from a tip to a tail, having deck and bottom sides and having first and second edges, the honeycomb core comprising a plurality of generally hollow cells arranged so that a longitudinal center line of at least one of the cells is transverse to the core deck and bottom sides, at least some cells of the honeycomb core extending between, engaging, and being tightly adhered to the skin deck and skin bottom, a first rail space being defined between the first edge of the core and the skin first rail, a second rail space being defined between the second edge of the core and the skin second rail; and
   first and second inserts disposed in the first and second rail spaces, respectively, the first and second inserts configured to provide support in a direction generally transverse to the longitudinal center line of the at least one of the honeycomb cells.

2. An aquatic gliding board as in claim 1, wherein the insert comprises a honeycomb material having cells, and a longitudinal center line of at least one of the honeycomb cells of the insert is generally transverse to the longitudinal center line of the at least one of the honeycomb core cells.

3. An aquatic gliding board as in claim 1, wherein the insert comprises an expanded foam.

4. An aquatic gliding board as in claim 1, wherein the skin comprises fibers suspended in a cured matrix.

5. An aquatic gliding board as in claim 4, wherein the skin comprises a deck skin having a body portion and a rail portion and a bottom skin having a body portion and a rail portion, each rail portion being arranged about edges of the respective deck skin or bottom skin and each rail portion being curved so as to extend transverse to the respective body portion, deck skin rail portion and bottom skin rail portions overlap one another, and wherein the deck skin defines the deck, the bottom skin defines the bottom, and the first and second rails comprise the overlapping rail portions.

6. An aquatic gliding board as in claim 5, wherein the skin is generally thickest at the overlapping rail portions.

7. An aquatic gliding board as in claim 5, wherein at least one of the overlapping rail portions of the deck skin and bottom skin is in tension.

8. An aquatic gliding board as in claim 5 additionally comprising a rail layer comprising fibers suspended in a cured matrix, the rail layer being adhered to the rail.

9. An aquatic gliding board as in claim 8, wherein the fibers in the deck and bottom skin portions are glass fibers, and wherein the rail layer comprises fibers other than glass fibers.

10. An aquatic gliding board as in claim 9, wherein in the rail layer comprises aramid fibers.

11. An aquatic gliding board as in claim 4, wherein at least a portion of the skin comprises a viscoelastic layer.

12. An aquatic gliding board as in claim 4 additionally comprising a support material adhered to a portion of the deck where a rider is likely to place his feet during riding.

13. An aquatic gliding board as in claim 4, wherein a layer of a non-fibrous material is attached to a portion of one or more of the skin deck and bottom.

14. An aquatic gliding board as in claim 1, wherein:
   the honeycomb core cells have a cell size of ⅛ inch to ⅜ inch; and
   the skin has a Young's modulus (Ef), an outer surface of the skin having a curving shape adapted so that a thickness of the surfboard varies along a longitudinal length and a transverse width of the surfboard;
   wherein the honeycomb core has a compressive modulus (Ec), and a longitudinal center line of at least one cell of the honeycomb core is directed generally perpendicular to the deck skin portion ; and
   wherein a ratio of the Young's modulus of the skin to the compressive modulus of the core (Ef/Ec) is 250 or less, and the core has a density of 3.5 lb./ft^3 or less.

15. An aquatic gliding board as in claim 14, wherein the honeycomb core comprises aluminum.

16. An aquatic gliding board as in claim 14, wherein the core has a density of 2.9 lb./ft^3 or less.

17. An aquatic gliding board as in claim 16, wherein the ratio of the Young's modulus of the skin to the compressive modulus of the core is 50 or less.

18. An aquatic gliding board as in claim 15, wherein the ratio of the Young's modulus of the skin to the compressive modulus of the core is 75 or less.

19. An aquatic gliding board as in claim 5, wherein the deck skin and the bottom skin are separately formed, and the overlapping rail portions are adhered together via an adhesive.

20. An aquatic gliding board as in claim 14, wherein the honeycomb core comprises Nomex.

* * * * *